Dec. 29, 1942.  F. G. THANNHAUSER  2,306,833
STORAGE BATTERY INSTALLATION
Filed Nov. 29, 1940  3 Sheets-Sheet 1

INVENTOR
Fred G. Thannhauser
BY Harness, Dind, Pateer Harris
ATTORNEYS.

Dec. 29, 1942.  F. G. THANNHAUSER  2,306,833
STORAGE BATTERY INSTALLATION
Filed Nov. 29, 1940  3 Sheets-Sheet 2
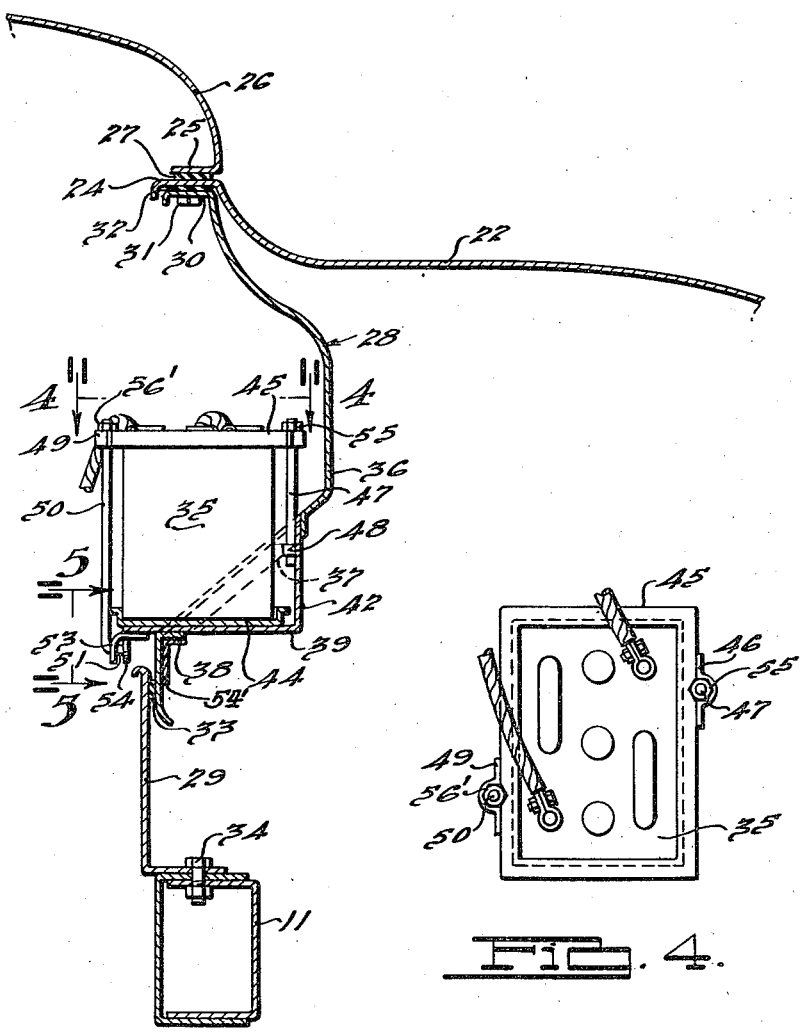
INVENTOR
Fred G. Thannhauser
BY
Harness, Dund, Patee & Harris
ATTORNEYS Dec. 29, 1942.  F. G. THANNHAUSER  2,306,833
STORAGE BATTERY INSTALLATION
Filed Nov. 29, 1940   3 Sheets-Sheet 3
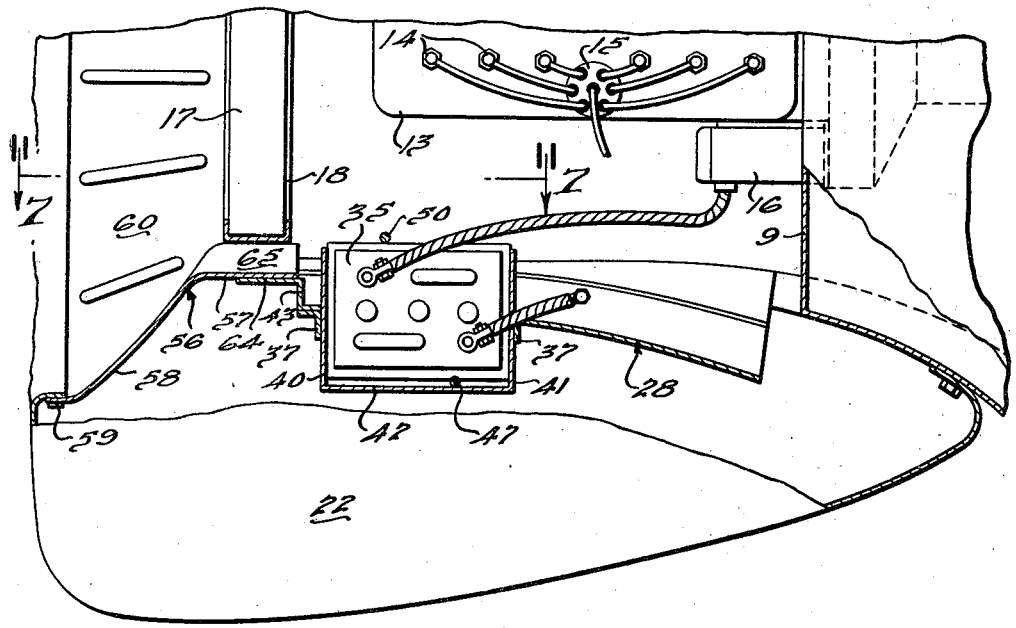
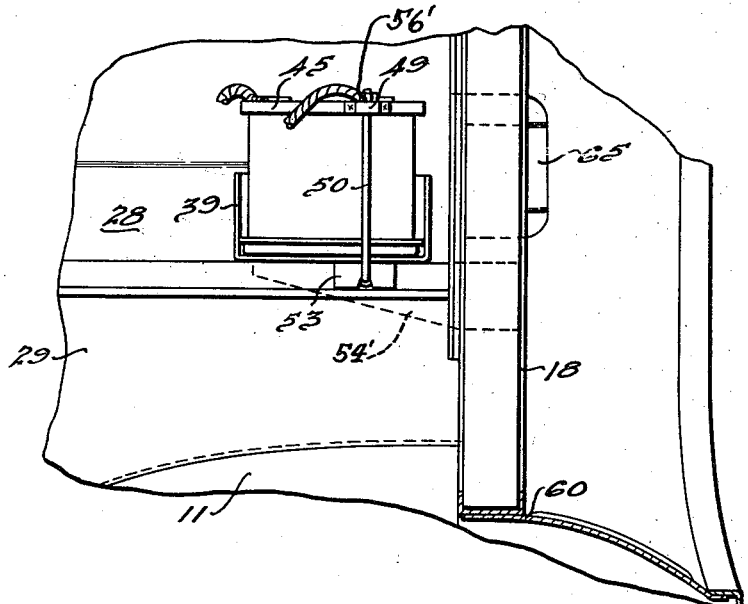
INVENTOR
Fred G. Thannhauser
BY
Harness, Lind, Patee & Harris
ATTORNEYS.

Patented Dec. 29, 1942

2,306,833

UNITED STATES PATENT OFFICE 2,306,833

STORAGE BATTERY INSTALLATION

Fred G. Thannhauser, Detroit, Mich., assignor to Chrysler Corporation, Highland Park, Mich., a corporation of Delaware Application November 29, 1940, Serial No. 367,704

12 Claims. (Cl. 180—68.5)

This invention relates to the mounting and installation of electric storage batteries in automotive vehicles.

An object of the invention is to mount the storage battery in such a manner that it is rendered readily accessible for service and does not interfere with access to the associate parts and mechanisms.

Another object of the invention is to dispose the battery in relatively close proximity to the electrical apparatus thus effecting a saving in the copper power leads to the apparatus.

A still further object of the invention is to so mount the battery that it will be subject to a minimum of vibration and to relieve the same from shocks incidental to vehicle operation.

It has been found convenient for purposes of accessibility to dispose the battery in the engine compartment of the vehicle and an object of the invention is to so arrange the compartment and the battery therein as to minimize the effects of engine heat. In carrying out this object the battery and compartment are so arranged that a continuous supply of fresh air is admitted to the latter during operation of the vehicle, the air so admitted being directed to the battery.

In carrying out the foregoing objects, the battery is preferably mounted on a sheet metal shield forming a wall bounding the engine compartment and separating the latter from the adjacent wheel house, the battery being disposed on the side of the shield adjacent the compartment, thus protecting it from dust, dirt and road film at the wheel house. The battery support is in turn so supported with respect to the vehicle frame as to accommodate limited relative movement between the latter and the support thus avoiding a rigid connection between these parts and the accompanying transfer of shocks. The improved arrangement disposes the battery in a position such that it is not subjected to injury caused by accidental scraping when the visible encounters irregular road surfaces, as deep rutted sections, and the vehicle frame and adjacently associated vehicle parts protect the battery against damage due to objects thrown up from the road during travel of the vehicle.

Another object of the invention is to provide a support to which the battery can be securely fixed with a minimum of securing parts.

Other objects of the invention will be more apparent from the following description taken in connection with the accompanying drawings, in which:

Fig. 3 is a fragmentary sectional view taken on line 3—3 of Fig. 1.

Fig. 4 is a top plan view of the storage battery and holding means therefor taken as indicated by the line 4—4 of Fig. 3.

Fig. 5 is a fragmentary side elevational view illustrating a portion of the removable holding means, the view being taken as indicated by the line 5—5 of Fig. 3.

Fig. 6 is a fragmentary top plan view, parts being in section, taken on the line 6—6 of Fig. 1.

Fig. 7 is a fragmentary side elevational view taken as indicated by the line 7—7 of Fig. 6.

Figure 1:
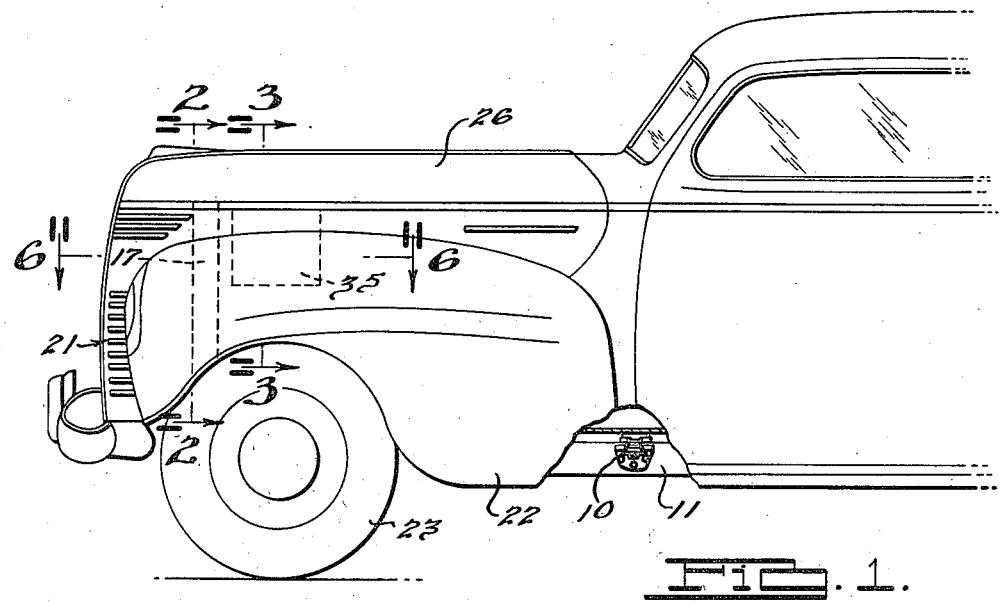
Fig. 1 is a side elevational view of a portion of an automotive vehicle including a storage battery mounted in accordance with the invention, part of the vehicle body being broken away to show the mounting of the body on the frame.

Referring to the drawings, the invention is illustrated in connection with motor vehicle passenger car although it will be understood that the same is equally applicable to the commercial type vehicles. The vehicle includes the usual passenger compartment and an engine compartment disposed forwardly thereof, these compartments being separated by the transversely extending dash 9 which forms the rear wall of the engine compartment. The body is mounted on a frame being connected at 10 to one of the laterally spaced longitudinally extending frame side rails, one of which is shown at 11, these rails being connected by longitudinally spaced cross members, one of which is shown at 12. The connection indicated at 10 may be of the type including a yieldable non-metallic material such as to accommodate limited movement of the body relative to the frame.

An internal combustion engine 13 is disposed in the compartment therefor and supported by the vehicle frame in the well known manner. Associated with the engine is the usual apparatus including spark plugs 14, distributor 15 and the electric starter 16. Disposed forwardly of the engine 13 is the radiator 17 which is supported by a frame 18, channel-shaped in cross section, and secured to the frame cross member 12 at 19. Interposed between the frame 18 and cross member 12 is a block of non-metallic material 20 which accommodates limited rocking movement of the frame 18 relative to the cross member 12. A grille structure, generally indicated by the numeral 21, disposed forwardly of the radiator 17, admits air to the latter.

Inasmuch as the electric storage battery is mounted on the left side of the engine compartment, as viewed by the vehicle operator, this side will be particularly described, as typical of the construction of the vehicle at and adjacent to the engine compartment.

A left front fender 22 is secured at the rear end portion thereto to the vehicle body adjacent the dash 9 and at the front end portion thereof to the radiator frame 18, the fender constituting a house for the adjacent road wheel 23. As shown more particularly in Fig. 3, the fender 22 has a flange 24 at the inner edge thereof extending longitudinally of the vehicle and on which rests a correspondingly arranged flange 25 of the hood 26 for the engine compartment, it being understood that the hood is hinged to permit raising thereof to gain access to this compartment. A non-metallic strip 27 is interposed between the flanges 24 and 25.

The engine compartment is bounded at the side thereof by a pair of wall forming members 28 and 29, preferably formed of sheet metal, which separate this compartment from the adjacent wheel house. These members extend between the vehicle dash 9 and the radiator frame 18 and shield the engine 13 and the mechanism in the compartment from foreign matter, such as gravel, water, and the like, cast up by the road wheel. The member 28 has a flange 30 at the upper edge thereof parallel with the fender flange 24 and secured thereto at spaced locations by rivets or the like, one of which is shown at 31, a non-metallic liner 32 being interposed between the flanges 24 and 30. The member 28 overlaps the radiator frame 18 for attachment thereto, as hereafter set forth, but is unattached at the rear end portion, the latter being laterally spaced from the body to facilitate escapement of air from the engine compartment. The lower edge of the member 28 overlaps the upper edge of the member 29 (Fig. 3) and is spaced therefrom by a non-metallic strip 33. The lower member 29 is secured to the vehicle frame side rail 11 at spaced locations by rivets or the like 34, it being understood that the members 28 and 29 are not secured together.

The storage battery 35 for the electrically operated apparatus is secured to and supported by the wall member 28, the latter being offset as at 36 to facilitate this arrangement. Referring specifically to Figs. 3 and 6, the member 28 has a portion of the metal removed, and the metal bounding the opening is flanged as at 37 and 38 to facilitate attachment, by welding, of a seat 39 to the member 28. The seat provides fore and aft walls 40 and 41 respectively as well as an outer side wall 42 (see Fig. 6), the member 28 terminating shortly beyond the forward edge of the battery 35 and is attached as by welding to a sheet metal member 43 angular in cross section. The member 43 constitutes an extension of the main member 28 and extends forwardly in overlapping relationship with the radiator frame 18. It will be understood that the members 28 and 43 may be formed as a single part if desired.

The battery 35 is placed in a pan 44 resting upon the seat 39 and for securing the same in position there is provided a frame 45 having right angular flanges, engaging the top and side faces respectively of the battery. A bracket 46 is secured to the vertical flange of one side of the frame and has an offset for receiving an attaching bolt 47 which is fixed to and carried by the seat 39 as at 48, and the opposite side of the frame 45 is provided with a similar bracket 49 for receiving the upper end of an attaching bolt 50. The lower end portion 51 of the latter is flanged and extends into a U-shaped opening 52 (see Fig. 5) formed in an angular sheet metal member 53 secured to the seat 39, the portion 51 having the end provided with a head 54. A brace member 54' extends between and is secured to the radiator frame 18 and the shield 29.

To remove the battery 35, the nut member 55 is removed from the bolt 47 and the nut member 56' is loosened from the bolt 50 only to the extent to permit the latter to drop downwardly out of the groove 52 so that the bolt 50 and frame 45 are removed together. Thus, this prevents the bolt 50 from dropping into the engine compartment.

Figure 2:
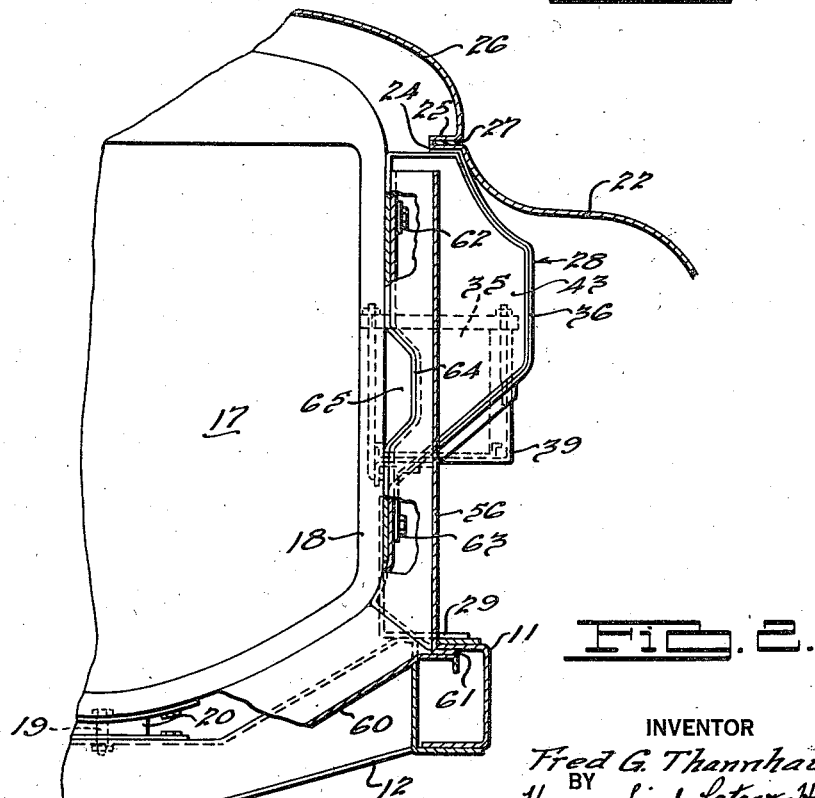
Fig. 2 is a transverse sectional view taken on line 2—2 of Fig. 1.

In order to ventilate the engine compartment and eliminate battery deterioration due to excessive heat in this compartment, the associated parts are so arranged as to direct air currents into the compartment in close proximity to the battery. Referring particularly to Fig. 6, it will be noted that air is passed around the radiator core 17 into the engine compartment and the associated side forming members 28, 29 are deflected to facilitate escape of air from the compartment. Air is directed toward the radiator 17 by a generally vertically disposed sheet metal member indicated at 56 having a rearwardly extending portion 57 in overlapping relationship with the radiator support 18 and the side forming member 43 and an outwardly flared portion 58 secured to the fender 22 at 59. Disposed immediately in front of the radiator 17 is a horizontally extending sheet metal member 60 secured as by welding to a horizontal flange 61 of the upright member 56 (Fig. 2). The overlapping portions of the members 43 and 56 are secured at 62 and 63 to the radiator support frame 18. Thus, the members 56 cooperate to direct air admitted through the grille 21 to the radiator 17, the member 60 forming the bottom wall of the compartment created in front of the radiator.

In order to admit air from this forward compartment directly to the engine compartment, the overlapping portions of the members 43 and 56 are offset at 64 to provide a passage 65 which is aligned vertically with the battery 35 the latter being disposed in the forward part of the engine compartment immediately adjacent this air inlet 65.

As herein supported, the battery is not directly subjected to shocks in the frame, it being noted that the support 28 therefor is secured to the radiator frame 18, and while the latter is secured to the frame it nevertheless is permitted to rock relative thereto. Where the connection at 10 is such as to accommodate limited relative movement of the body and frame there is a further lessening of shock to the battery. The sheet metal parts, while providing a stabilized support, nevertheless do not constitute a rigid structure and the battery is not subject to the shocks which would arise when it is connected directly to the vehicle frame, for example.

I claim:

1. In an automotive vehicle including a body having a dash and an internal combustion engine having electrically operated apparatus associated therewith, an engine supporting frame, a compartment for said engine at one end portion of said body, a sheet metal member secured to said body and movable relative to said frame, said member forming at least a portion of a side wall bounding said engine compartment, and a storage battery for supplying electrical energy to said apparatus supported by said member in said compartment.

2. In an automotive vehicle including a body having a dash and an internal combustion engine having electrically operated apparatus associated therewith, a compartment for said engine at one end portion of said body, a frame structure supporting said engine, a fender projecting laterally of said compartment, a sheet metal member secured to said body disposed between said fender and said compartment and forming at least a portion of a side wall bounding the latter, said member being movable relative to said frame structure, and a storage battery for supplying electrical energy to said apparatus supported by said member in said compartment.

3. In an automotive vehicle including a frame structure and a body supported thereon, an internal combustion engine having electrically operated apparatus associated therewith, a compartment for said engine forwardly of said body, a fender projecting laterally from said compartment secured to said body, a sheet metal member secured to the upper portion of said fender and projecting downwardly from the latter toward said frame structure for movement relative thereto, said member bounding at least a portion of said compartment and having a portion thereof offset laterally therefrom, and a storage battery for supplying electrical energy to said apparatus seated on said offset portion within said compartment.

4. In an automotive vehicle including a body having a dash, an internal combustion engine having electrically operated apparatus associated therewith, a chassis frame structure supporting said engine and body, a compartment for said engine forwardly of said dash, cooling means for said engine including a radiator having a support disposed forwardly of said engine, a shield extending between said dash and support forming at least a portion of a side wall bounding said compartment, said shield being movable relative to said frame structure, and a battery for supplying electrical energy to said apparatus supported by said shield in said compartment.

5. In an automotive vehicle including a frame and a body mounted thereon having a dash, an internal combustion engine having electrically operated apparatus associated therewith, a compartment for said engine forwardly of said dash, cooling means for said engine including a radiator having a support disposed forwardly of said engine and secured to said frame for limited movement relative thereto, a sheet metal shield extending between said dash and said support secured to the latter and said body and forming at least a portion of a wall bounding said compartment, said shield being movable realtive to said frame, and a storage battery for supplying energy to said apparatus supported by said shield in said compartment.

6. In an automotive vehicle including a body having a dash, an engine compartment having electrically operated apparatus therein disposed forwardly of and bounded at the rear by said dash, a frame supporting said body, a side wall for said compartment secured to said body extending forwardly from said dash and movable relative to said frame, and a storage battery for supplying electrical energy to said apparatus supported by said side wall in said compartment.

7. In an automotive vehicle including a body and an engine compartment forwardly of the body having electrically operated apparatus therein, a radiator and support therefor disposed adjacent the forward portion of said compartment, a shield extending between the body and radiator support registering with and abutting a side face of the latter and secured to said support, a portion of said shield registering with said side face being offset laterally from said side face to form an opening between said side face and said shield for accommodating the passage of air therebetween and directly to said compartment, and a storage battery supported by said shield in said compartment adjacent to and in alignment with said opening.

8. In an automotive vehicle including a body structure, a compartment for an engine having electrically operated apparatus therein, a chassis frame structure, a wheel house disposed laterally of said compartment, a sheet metal wall between said wheel house and compartment, a connection between said wall and frame accommodating relative movement therebetween, and a storage battery for supplying electrical energy to said apparatus supported by said wall.

9. In an automotive vehicle including a frame structure and a body structure mounted thereon, an engine compartment forwardly of the body having electrically operated apparatus therein, a wheel house disposed laterally of said compartment, a wall separating said wheel house and compartment including relatively movable sheet metal members secured to said structures respectively, and a storage battery for supplying electrical energy to said apparatus supported by the sheet metal member secured to said body structure.

10. In an automotive vehicle including a frame structure and a body structure mounted thereon, an internal combustion engine having electrical apparatus associated therewith, a compartment for said engine, a radiator and a support therefor secured to said frame structure for movement relative thereto, a wheel house disposed laterally of said compartment, a wall separating said wheel house and compartment including relatively movable sheet metal members, one of said members being secured to said frame structure and the other thereof being secured to said body structure and said support, and a storage battery for supplying electrical energy to said apparatus supported by the last mentioned member.

11. In an automotive vehicle including a frame structure and a body structure mounted thereon, an internal combustion engine having electrical apparatus associated therewith, a compartment for said engine, a radiator and a support therefor secured to said frame structure for movement relative thereto, a wheel house disposed laterally of said compartment, a wall separating said wheel house and compartment including relatively movable sheet metal members, one of said members being secured to said frame structure and the other thereof being secured to said body structure and said support, and a storage battery for supplying electrical energy to said apparatus supported by the last mentioned member adjacent said support, a portion of said last mentioned member being spaced laterally from said support whereby to accommodate the admission of air to said compartment in direct alignment with said battery.

12. In an automotive vehicle including a frame structure and a body structure mounted thereon having a yieldable connection therewith accommodating limited relative movement therebetween, an internal combustion engine having electrical apparatus associated therewith, a compartment for said engine at the forward end portion of said body structure, a radiator disposed adjacent said engine, a support for said radiator having a yieldable connection with said frame structure accommodating limited relative movement therebetween, a sheet metal shield extending between and secured to said support and body structure forming at least a portion of a side wall for said compartment, and a storage battery for supplying electrical energy to said apparatus secured to and supported by said shield.

FRED G. THANNHAUSER.